United States Patent [19]
Drexler

[11] Patent Number: 4,711,996
[45] Date of Patent: * Dec. 8, 1987

[54] REDUNDANT OPTICAL RECORDING OF INFORMATION IN DIFFERENT FORMATS

[75] Inventor: Jerome Drexler, Los Altos Hills, Calif.

[73] Assignee: Drexler Technology Corporation, Mountain View, Calif.

[*] Notice: The portion of the term of this patent subsequent to Feb. 19, 2002 has been disclaimed.

[21] Appl. No.: 721,382

[22] Filed: Apr. 9, 1985

Related U.S. Application Data

[63] Continuation-in-part of Ser. No. 693,856, Jan. 22, 1985, which is a continuation-in-part of Ser. No. 443,596, Nov. 22, 1982, Pat. No. 4,503,135, which is a continuation-in-part of Ser. No. 238,832, Feb. 27, 1981, Pat. No. 4,360,728, and a continuation-in-part of Ser. No. 238,833, Feb. 27, 1981, abandoned.

[51] Int. Cl.$^4$ .............................................. G06K 7/10
[52] U.S. Cl. .................................... 235/468; 235/454; 235/487; 283/75; 283/904; 346/76 L
[58] Field of Search ....................... 235/454, 487, 468; 283/75, 86, 904; 346/76 L; 354/5

[56] References Cited

U.S. PATENT DOCUMENTS

| | | | |
|---|---|---|---|
| 3,790,757 | 2/1974 | Shaw | 235/487 X |
| 4,145,758 | 3/1979 | Drexler et al. | 430/616 |
| 4,151,667 | 5/1979 | Idelson et al. | 40/2.2 |
| 4,171,864 | 10/1979 | Juna et al. | 283/75 X |
| 4,213,038 | 7/1980 | Silverman et al. | 235/382 |
| 4,236,332 | 12/1980 | Domo | 40/2.2 |
| 4,254,329 | 3/1981 | Gokey et al. | 235/454 X |
| 4,269,917 | 5/1981 | Drexler et al. | 430/16 |
| 4,278,756 | 7/1981 | Bouldin et al. | 430/414 |
| 4,298,684 | 11/1981 | Bouldin et al. | 430/616 |
| 4,314,260 | 2/1982 | Drexler | 346/76 L |
| 4,343,879 | 8/1982 | Drexler et al. | 430/14 |
| 4,360,728 | 11/1982 | Drexler | 346/76 L X |
| 4,500,777 | 2/1985 | Drexler | 235/487 |
| 4,544,835 | 10/1985 | Drexler | 235/487 |

FOREIGN PATENT DOCUMENTS 2036369  6/1980  United Kingdom .
2044175  10/1980  United Kingdom .

*Primary Examiner*—David L. Trafton

[57] ABSTRACT

Information is recorded in situ on a wallet-size card by disposing laser recordable material in the card, then recording indicia, in situ, on the material with a laser. At least some of the indicia are microscopic eye readable information, with the rest being machine readable information, with the eye readable information being redundant with at least some of the machine readable information. This visually read information is recorded as characters made up of matrices of nonconnected laser recorded spots. The characters may be alphanumeric characters, or the like. The characters are read with an optical magnifier. A laser beam and light detector may be used to read the digital information by scanning the card with the beam.

28 Claims, 5 Drawing Figures

REDUNDANT OPTICAL RECORDING OF INFORMATION IN DIFFERENT FORMATS

CROSS REFERENCES TO RELATED APPLICATIONS

This is a continuation-in-part of U.S. patent application Ser. No. 693,856 filed Jan. 22, 1985, which is a continuation-in-part of U.S. patent application Ser. No. 443,596 filed Nov. 22, 1982, now U.S. Pat. No. 4,503,135 which is a continuation-in-part of U.S. patent application Ser. No. 238,832 filed Feb. 27, 1981, now U.S. Pat. No. 4,360,728, granted Nov. 23, 1982 and U.S. patent application Ser. No. 238,833 filed Feb. 27, 1981, now abandoned.

TECHNICAL FIELD

The invention relates to optical data information storage and more particularly to a method and system for recording laser written information.

BACKGROUND ART

Silverman et al. teach in U.S. Pat. No. 4,213,038 an access control system with an identification card. The card has machine recordable indicia used to choose a master microspot pattern from the machine's memory. This master pattern is compared with an identical pattern on the card for verification. The card also has space for a picture and a signature. Similarly, Idelson et al. (U.S. Pat. No. 4,151,667) teach an identification card having a photograph and a phosphorescent bar code pattern used for verification. The amount of information these cards can hold is extremely limited. Random microspot patterns can only be used for verification, while bar codes can only represent a small amount of specific data.

In U.S. Pat. No. 4,254,329 to Gokey et al., an information retrieval system includes a microfiche data base of two types of microfiche cards. One type is machine readable only, while the other has both machine readable and visually readable information. This information cannot be updated.

In U.S. Pat. No. 4,236,332, Domo discloses a medical record card containing a microfilm portion having some data visible to the eye and other data visible by magnification. The directly visible data is alphanumeric character codes pertaining to emergency medical conditions of the patient and the magnifiable data portions detail the medical history. This information cannot be updated.

In optical data storage cards, reliability and ease of reading the data are important. Data may be recorded in an office environment, but need to be read in a dirty environment or when no card reading machine is available, such as in an emergency. For example, medical-record cards should be readable in an ambulance, at the scene of an accident, or on a battlefield. In such conditions, it may be difficult or impossible to read the digitally recorded data.

An object of the invention is to provide laser written data, ordinarily only machine readable, which can be read without a machine.

Another object of the invention is to provide updatable information on a laser recordable card in both machine readable digital form and human readable without a machine.

DISCLOSURE OF THE INVENTION

The above object has been met with a method and system for laser recording, in situ, of both eye readable information and digital machine readable information, with partial redundancy, on a strip of optical contrasting laser recording material, disposed on a wallet-sized card. A laser beam records machine readable data on the strip of optical storage material, in situ, either by ablation, melting, physical or chemical change, thereby forming spots representing changes in reflectivity. The recording process produces differences in reflectivity detectable by a light detector. The recording may be done either before the strip is adhered to the card or in situ on the card. The card may have strips of laser recording material on both sides. No processing after laser recording is required when the recording strip is a direct-read-after-write material. Laser recording materials also may be used that require heat processing after laser recording.

Microscopic eye readable information, at least partially redundant with the machine readable data, is also recorded on the strip with a laser. Characters are recorded as matrices of spots on the laser recordable material, and are readable with an optical magnifier. These spots are written by scanning in a zig-zag or raster-like pattern over the matrix and writing laser spots at designated locations so that characters can be formed. Such characters are formed directly by the spots or by groups of laser spots, called character spots. Depending on the available software, the microscopic visually read characters created by the spots may include alphanumerics, script writing, foreign language alphabets and numerics, foreign language picture characters such as Chinese and Japanese characters, mathematical symbols, logic symbols, scientific and musical notations, and other symbols and notations. It could also include emblems, logos, codes, and trademarks.

The uniform surface reflectivity of this optically contrasting strip before recording typically would range between 8% and 65%. By optically contrasting strip is meant that recorded spots have optical contrast relative to the field in which they are situated. For a highly reflective strip the average reflectivity over a laser recorded spot might be in the range of 5% to 25%. Thus, the reflective contrast ratio of the recorded spots would range between 2:1 and 7:1. Laser recording materials are known in the art that create either low reflectivity spots in a reflective field or high reflective spots in a low reflectivity field. An example of the latter type is described in U.S. Pat. No. 4,343,879. When the reflectivity of the field is in the range of 8% to 20% the reflective spots have a reflectivity of about 40%. The reflective contrast ratio would range from 2:1 to 5:1. Photographic pre-formatting would create spots having a 10% reflectivity in a reflective field or 40% in a low reflectivity field.

By means of in-situ laser recording, transaction data, personal information, or the like may be recorded at subsequent times. For example, insurance claims or medical record entries may be processed sequentially, recording various transactions on the strip one after another, without erasing data. Digital voice recordings or signatures could also be recorded. Information that needs to be read in an emergency where no card reading machine is available is written redundantly with machine readable information in microscopically eye readable form. The information would include personal and medical information, transactions, office forms, multiple language information, insurance information, titles and instructions. Maps, charts, tables, graphs, diagrams, and written music could also be recorded in this form.

BEST MODE FOR CARRYING OUT THE INVENTION

Figure 1:
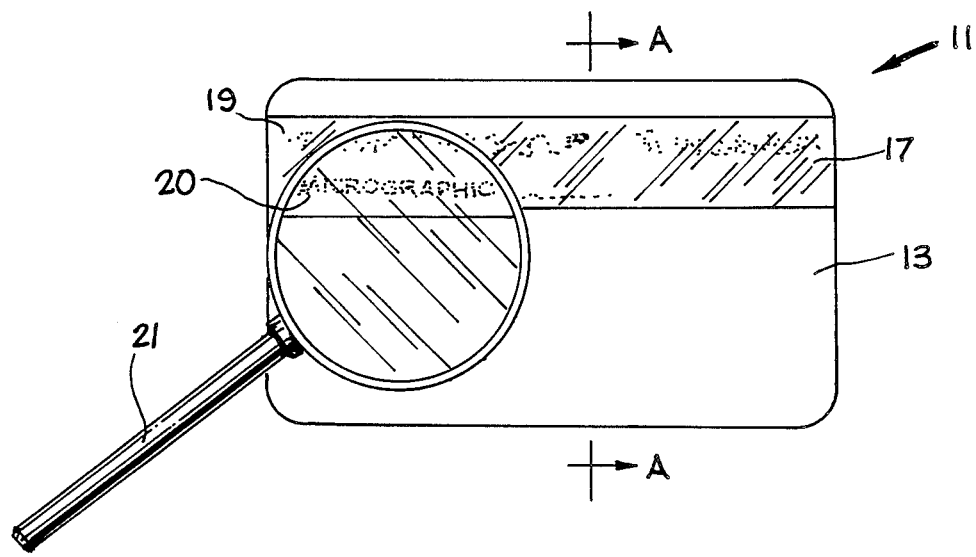
FIG. 1 is a top plan view of a card having information recorded by the present invention.

With reference to FIG. 1, a data card 11 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 is a dielectric, usually a plastic material such as polyvinyl chloride or similar material. Polycarbonate plastic is preferred. The surface finish of the base should have low specular reflectivity, preferably less than 10%.

Base 13 carries strip 17. The strip is typically 16 or 35 millimeters wide and extends the length of the card. Alternatively, the strip may have other sizes and orientations. The strip is relatively thin, typically 60–200 microns, although this is not critical. Strips of laser recording material may be applied to both sides of card 11. The strip may be applied to the card by any convenient method which achieves flatness.

Figures 3, 4:
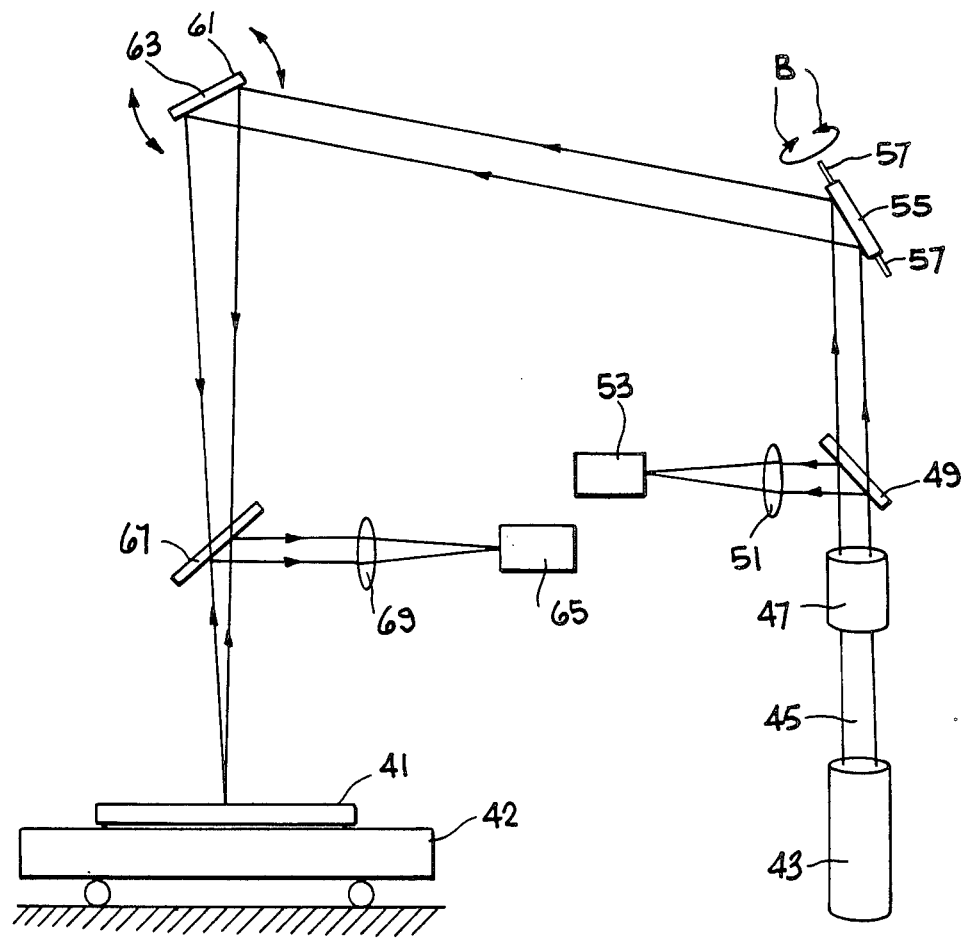
FIG. 3 is a partial sectional view of an alternate embodiment of the medium of FIG. 1.
FIG. 4 is a plan view of optical apparatus for reading and writing on the data strip portion of the medium illustrated in FIG. 1.

The strip 17 is adhered to the card with an adhesive and is covered by a transparent laminating sheet 76 seen in FIG. 3 which serves to keep strip 17 flat, as well as protecting the strip from dust and scratches. Sheet 76 is a thin, transparent plastic sheet laminating material or a coating, such as a transparent lacquer. The material is preferably made of polycarbonate plastic.

The high resolution laser recording material which forms strip 17 may be any of the reflective recording material which have been developed for use as direct read-after-write (DRAW) optical disks, so long as the materials can be formed on thin substrates. An advantage of reflective materials over transmissive materials is that the read/write equipment is all on one side of the card, the data storage capacity is doubled and automatic focus is easier. For example, the high resolution material described in U.S. Pat. No. 4,230,939 issued to de Bont, et al. teaches a thin metallic recording layer of reflective metals such as Bi, Te, Ind, Sn, Cu, Al, Pt, Au, Rh, As, Sb, Ge, Se, Ga.

Materials which are preferred are those having high reflectivity and low melting point, particularly Cd, Sn, Tl, Ind, Bi and amalgams. Suspensions of reflective metal particles in organic colloids also form low melting temperature laser recording media. Silver is one such metal. Typical recording media are described in U.S. Pat. Nos. 4,314,260, 4,298,684, 4,278,758, 4,278,758, 4,278,756 and 4,269,917, all assigned to the assignee of the present invention.

The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio and form high contrast data bits with the read/write system with which it is used.

The material should not lose data when subjected to temperatures of about 180° F. (82° C.) for long periods. The material should also be capable of recording at speeds of at least several thousand bits/sec. This generally precludes the use of materials that require long heating times or that rely on slow chemical reactions in the presence of heat, which may permit recording of only a few bits/sec. A large number of highly reflective laser recording materials have been used for optical data disk applications.

Data is recorded by forming spots in the surrounding field of the reflective layer itself, thereby altering the reflectivity in the data spot. Data is read by detecting the optical reflective contrast between the surrounding reflective field of unrecorded areas and the recorded spots. Spot reflectivity of less than half the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 10%, thus creating a contrast ratio of greater than five to one. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding spiked field reflectivity produces a contrast ratio of at least two to one, which is sufficient contrast for reading.

Data strip 17 is intended to provide a data record and has digital information indicia and microscopic visually readable information. Digital machine readable data is written in individual tracks extending in a longitudinal direction, as indicated by the spot patterns 19 and these spot patterns are analogous to sound track on a film, except that the data tracks contain a much higher density of information and are usually read in reflection, rather than in transmission. The information density is greater because each of the spots in the spot pattern is approximately 5–10 microns in diameter with a spacing of about 5–10 microns between spots. The spots are recorded by a laser in the usual way, for example as shown in U.S. Pat. No. 4,278,756 to Bouldin, et al.

Strip 17 also has microscopic visually readable information 20. The information is recorded as a matrix of character spots by a laser by scanning in a zig-zag or raster-like pattern over the matrix and writing laser spots, in much the same way that digital spots 19 are recorded, at designated locations to form characters. The information matrices are generally about 200 microns high, so they are read by magnification, such as through optical magnifier 21.

Figure 2A:
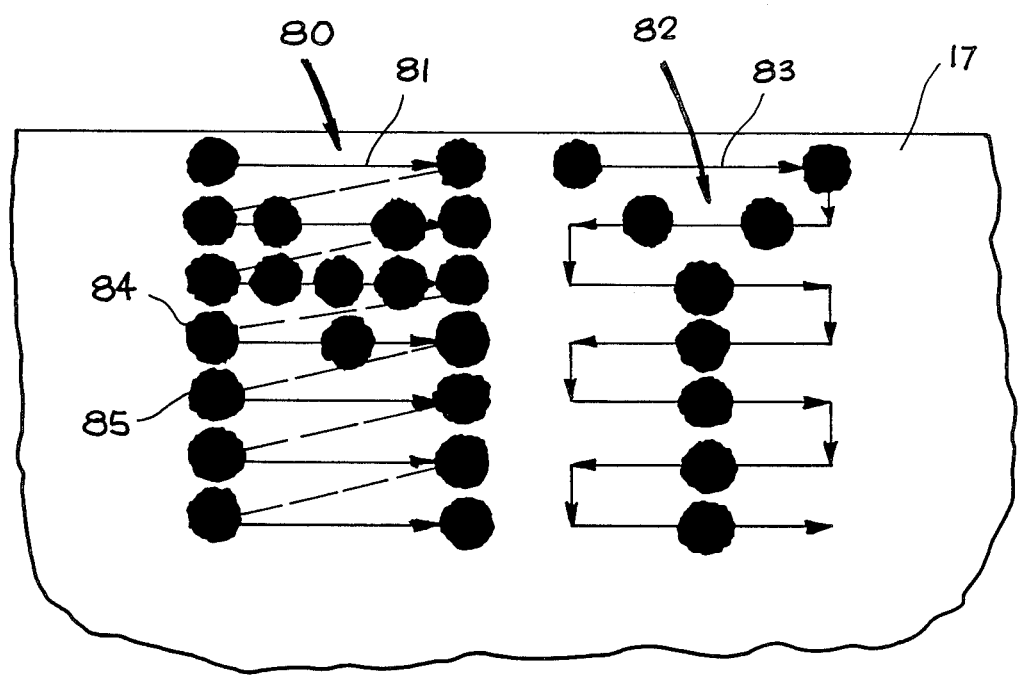
FIG. 2a is a top enlarged view of one embodiment of characters recorded by the present invention.

In FIG. 2a, microscopic visually readable information is recorded on a portion of strip 17. The information may be personal information, medical records, transactions, office forms, instructions, multiple language information, or titles for the digital record on the strip. The information is in the form of characters, such as the alphanumeric characters "M" 80 and "Y" 82, shown in FIG. 2a by way of example. The characters 80 and 82 are made up of matrices of laser recorded character spots. In this embodiment, each character spot is made of a single laser spot. The spots may or may not touch adjacent spots.

The matrices may be five spot sites by seven spot sites, such as in FIG. 2a, seven spot sites by ten spot sites, ten by fourteen or some other combination of spot sites. These spots are written by scanning in a raster-like pattern 81 or a zig-zag pattern 83 over the matrix and writing laser spots at designated locations so that characters can be formed. Such characters are formed directly by the spots or by groups of laser spots, termed character spots. Multiples of five by seven are convenient owing to existing software for CRT displays and dot matrix printers which can be adapted for use in laser recording. The actual character set recordable by this method would depend on the software used. The spots in a seven by ten matrix have a diameter of about 20 microns, making the height of a character about 200 microns. The characters are seen by magnification, such as through a pocket-type optical magnification device. Characters seen through a 20 power device will appear to be about four millimeters high. The characters are redundant with machine readable information so that critical information may be read even when a machine, necessary for reading other laser written data, is not available.

Figure 2B:
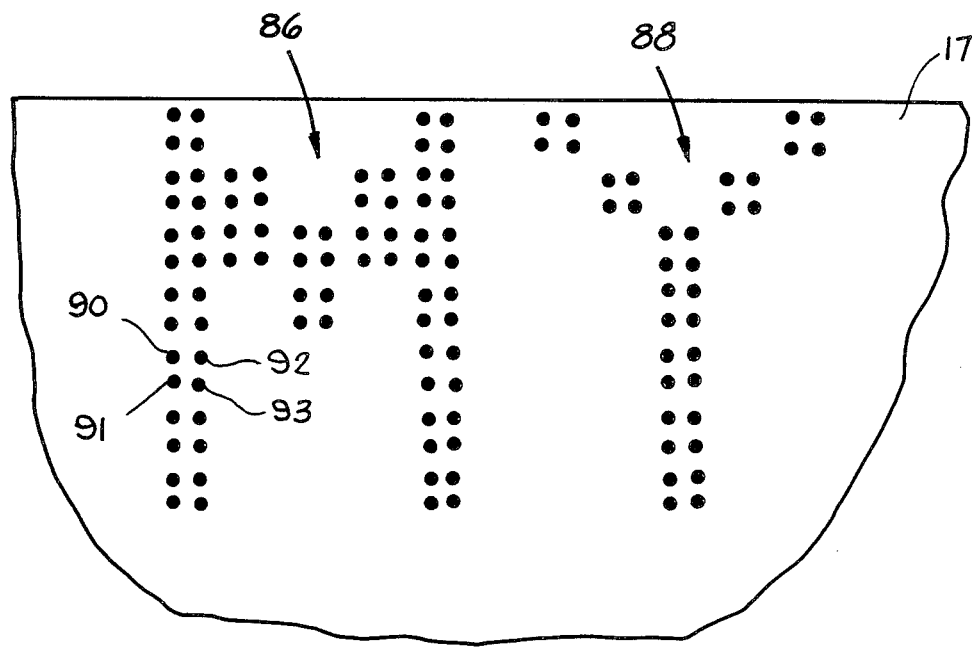
FIG. 2b is a top enlarged view of another embodiment of characters recorded by the present invention.

In FIG. 2b, characters 86 and 88 are recorded on strip 17. FIG. 2b is identical to FIG. 2a except that the character spots are formed from a group of four laser spots. Each laser spot is approximately 10 microns in diameter, making a character spot 20 microns square, as in FIG. 2a. This and the following group spot format are more convenient in many applications, since it permits the same diameter laser beam for writing both the machine readable and microscopically eye readable information. Alternatively, character spots can be made of 16 five-micron laser spots in a square or some other number of spots.

With reference to FIG. 3, a card substrate 70 carries a secondary substrate 72 which is a thin flexible material, only a few mils thick carrying a laser recording material 74. The secondary substrate 72 is adhered to the primary substrate 70 by means of an adhesive or sticky substance, similar to dry adhesives found on tape. The laser recording material may be any of the materials previously discussed. A protective coating 76 is applied over the laser recording material.

Remarks in the form of microscopic visually readable alphanumerics, foreign language characters, mathematical symbols, and the like, may be laser recorded along with digital machine readable information. By this means these two forms of communication will not be separated. Transaction or other information related to a person may be recorded on the card. Such transaction information could be banking information, such as a record of deposits and withdrawals. In former years, such transactions were recorded in a passbook, but because of the amount of time taken for sequential entries in a passbook, and because of automation, passbook banking was abandoned, even though it was more favorable to consumers. Now, sequential transactions may be recorded automatically so that a consumer may once again have a complete record of prior transactions, although a card reader is necessary. Insurance transactions, immigration matters and the like all involve sequential transactions involving personal data. While it is important to record the transaction, it is also important to relate the transaction to eye readable personal data so that a human judgment may be formed.

Of course, while the microscopic visually readable information may be read by conventional optical means, low-powered laser or a photodetector array apparatus must be used to read digital information on the data strip. Both forms of data must be laser recorded. A laser apparatus is illustrated in FIG. 4, which illustrates the side view of the lengthwise dimension of the medium of FIG. 1 consisting of a data strip having digital information in combination with microscopic visually readable information on a card. The data strip portion 41 of the medium is usually received in a movable holder 42 which brings the strip into the trajectory of a laser beam. A laser light source 43, preferably a pulsed semiconductor laser of infrared wavelength emits a beam 45 which passes through collimating and focusing optics 47. The beam is sampled by a beam splitter 49 which transmits a portion of the beam through a focusing lens 51 to a photodetector 53. The detector 53 confirms laser writing. The beam is then directed to a first servo controlled mirror 55 which is mounted for rotation along axis 57 in the direction indicated by arrows B. The purpose of the mirror 55 is to find the lateral edges of the data strip in a coarse mode of operation and then in a fine mode of operation identify data paths or character sites which exist predetermined distances from the edges.

From mirror 55, the beam is directed toward a mirror 61. This mirror is mounted for rotation at pivot 63. The purpose of mirror 55 is for fine control of motion of the beam along the length of the data strip. Coarse control of the lengthwise portion of the data strip relative to the beam is achieved by motion of the movable holder 42. The position of the holder may be established by a linear motor and used by a closed loop position servo system of the type used in magnetic disk drives. Reference position information may be prerecorded on the card so that position error signals may be generated and used as feedback in motor control. Upon reading one data path, the mirror 55 is slightly rotated. The motor moves holder 42 lengthwise so that the path can be read again, and so on.

For writing microscopic visually readable information, mirror 55 is used to identify character sites at predetermined distances from the edges. Mirror 57 moves the scanning beam lengthwise from character site to character site. Upon reading one row of character sites, mirror 55 is slightly rotated. Within a character site, mirrors 55 and 57 cooperate to move the beam in either a zig-zag pattern or a raster-like pattern. Laser spots are written at designated locations within a character site to form a character. When one character is written mirrors 55 and 57 move the beam to the next character site.

As light is scattered and reflected from spots in the laser recording material, the percentage of reflected light from the incident beam changes relative to surrounding material where no spots exist. The incident laser beam should deliver sufficient laser energy to the surface of the recording material to create spots in the data writing mode, but should not cause disruption of the surface so as to cause difficulty in the lower beam power data reading mode. The wavelength of the laser should be compatible with the recording material to achieve this purpose. In the read mode, power is approximately 5% to 10% of the recording or writing power.

Differences in reflectivity between a spot and surrounding material are detected by light detector 65 which may be a photodiode. Light is focused onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to pits. Other optics, not shown, could be used to observe the microscopic visibly readable information while data is being read or written on the data strip.

A photodetector array such as a CCD could also be used. It could be either a linear array or area array. The number of detector elements per track would be approximately three elements to create a reading redundancy. The surface would be illuminated with low-cost light-emitting diodes generating power primarily in the near infra-red to match the sensitivity spectrum of the photodetector array.

What is claimed is:

1. A method for recording information in situ on a card comprising,
    disposing at least one strip of optical contrast direct-read-after-write laser recording material in a carrier and
    recording information indicia onto said strip, in situ, by means of a laser, at least some of said information indicia being microscopically eye readable information, the other information being machine readable information, the eye readable information being redundant with at least some of the machine readable information.

2. The method of claim 1 where the field of the laser recording material is reflective relative to the data spots and said machine readable information is a digital recordation.

3. The method of claim 1 wherein said microscopically eye readable information is recorded as characters made up of a matrix of individual laser recorded character spots on said optical data storage lamella.

4. The method of claim 1 wherein said carrier is a wallet-size card.

5. The method of claim 3 wherein said characters are alphanumeric characters.

6. The method of claim 3 wherein said characters are foreign language characters.

7. The method of claim 3 wherein said characters are mathematical symbols.

8. The method of claim 1 wherein said information indicia is personal information relating to a person.

9. The method of claim 1 wherein said information indicia is medical records relating to a person.

10. The method of claim 1 wherein said information indicia is transaction data.

11. The method of claim 1 wherein said information indicia is multilanguage information.

12. The method of claim 3 wherein said matrix of spots is a five by seven matrix.

13. The method of claim 3 wherein each of said character spots is a single laser spot, said laser spot being ten and twenty microns in diameter.

14. The method of claim 3 wherein each of said character spots is a group of laser spots, each laser spot having a diameter less than ten microns.

15. A system for sequentially recording information with a laser comprising,
    a wallet size card having at least one strip of optical contrast direct-read-after-write laser recording material thereon capable of in-situ laser recording of information thereon, at least some of the laser recorded information being microscopically eye readable information, the other information being machine readable information, the recording material adapted for laser recording of subsequent sequential data, eye readable information being redundant with at least some of the machine readable information,
    laser means having a beam disposed in laser writing relation with respect to said laser recording material for writing sequential data thereon,
    a light detector means disposed in reading relation to said recording material for reading said sequential data, and
    means providing relative motion between the beam and the card for reading and writing said sequential data on the card.

16. The system of claim 15 wherein said laser recorded microscopically eye readable information is characters made up of a matrix of individual laser recorded character spots on said laser recording material.

17. The system of claim 15 wherein at least some of said microscopically eye readable information is duplicated with laser recorded information that is digitally recorded on said laser recording material.

18. The system of claim 16 wherein said characters are alphanumeric.

19. The system of claim 16 wherein said matrix of spots is a five by seven matrix.

20. The system of claim 16 wherein each of said character spots is a single laser spot, said laser spot being between ten and twenty microns in diameter.

21. The system of claim 16 wherein each of said character spots is a group of laser spots, each laser spot having a diameter less than ten microns.

22. The system of claim 16 wherein said characters are foreign language characters.

23. The system of claim 16 wherein said characters are mathematical symbols.

24. The system of claim 15 wherein said laser recorded information is personal information relating to a person.

25. The system of claim 15 wherein said laser recorded information is medical records relating to a person.

26. The system of claim 15 wherein said laser recorded information is transaction data.

27. The system of claim 15 wherein said laser recorded information is multilanguage information.

28. The system of claim 15 wherein the field of laser recording on said card is reflective relative to the data spots.

* * * * *